United States Patent [19]

Budecker

[11] Patent Number: 4,983,100
[45] Date of Patent: Jan. 8, 1991

[54] RADIAL PISTON PUMP

[75] Inventor: Ludwig Budecker, Frankfurt am Main, Fed. Rep. of Germany

[73] Assignee: Alfred Teves GmbH, Frankfurt am Main, Fed. Rep. of Germany

[21] Appl. No.: 441,797

[22] Filed: Nov. 27, 1989

[30] Foreign Application Priority Data

Dec. 2, 1988 [DE] Fed. Rep. of Germany ....... 3840691

[51] Int. Cl.⁵ ............................................... F04B 1/04
[52] U.S. Cl. ..................... 417/271; 417/319; 303/87; 92/148
[58] Field of Search ............... 417/271, 273, 319, 534, 417/535, 538; 91/491; 92/72, 148; 303/87

[56] References Cited

U.S. PATENT DOCUMENTS

| | | | |
|---|---|---|---|
| 2,621,607 | 12/1952 | Trapp | 417/273 |
| 3,431,865 | 3/1969 | Cook et al. | 417/273 |
| 3,514,224 | 5/1970 | Budecker et al. | |
| 4,223,595 | 9/1980 | Ortelli | 92/148 |
| 4,621,982 | 11/1986 | Schultz et al. | 417/319 |

FOREIGN PATENT DOCUMENTS 2554783 6/1977 Fed. Rep. of Germany .
3701857 8/1988 Fed. Rep. of Germany .

*Primary Examiner*—Leonard E. Smith
*Assistant Examiner*—Robert N. Blackman
*Attorney, Agent, or Firm*—Robert P. Seitter; J. Gordon Lewis

[57] ABSTRACT

A radial piston pump in which an annular coupling device (10), whose axially directed extensions (11) each engage a working piston, has a preset break point (15) in the area of the axial extensions (11).

9 Claims, 2 Drawing Sheets

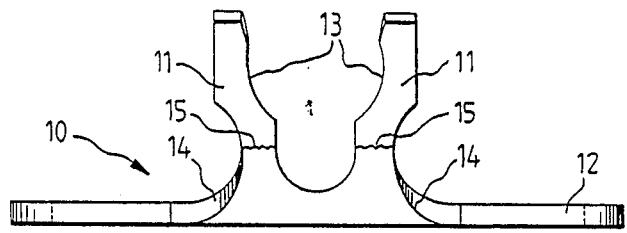
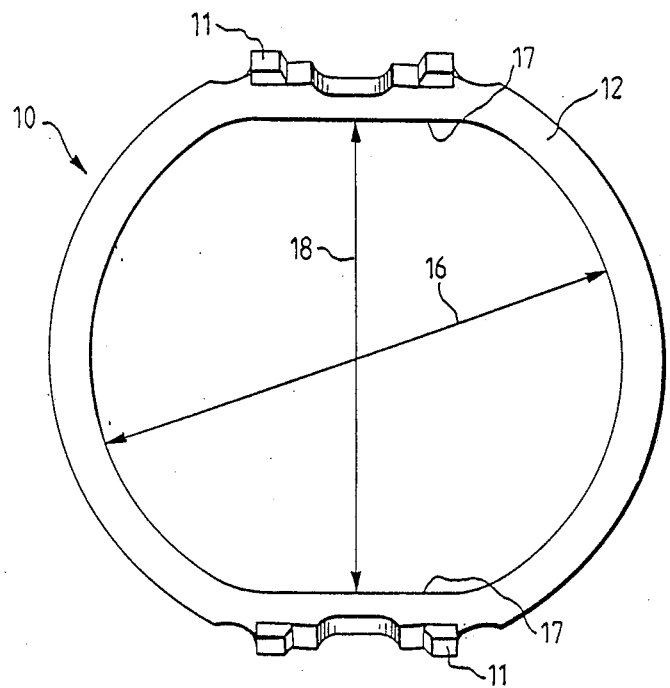

RADIAL PISTON PUMP

TECHNICAL FIELD

The present invention relates to a radial piston pump. Such radial piston pumps are distinguished by their compact construction and by their efficiency, which is due to small friction losses. The coupling device in such pumps provides for the radially inwardly directed stroke.

BACKGROUND OF THE INVENTION

A radial piston pump of this type is disclosed in German published patent application No. 37 01 857. In that radial piston pump, there is the risk that the annular portion of the coupling device will tear off if, for instance, one of the pistons becomes jammed by contamination. Should that occur, the entire pump would fail.

SUMMARY OF THE INVENTION

Therefore, the object of the present invention is to improve a radial piston pump such that the pump can continue to supply pressure fluid even after one working piston fails.

This object is achieved, according to the present invention, by providing axial extensions which comprise a preset breaking point. Accordingly, pressure-fluid supply is safeguarded even if a jammed piston has damaged the coupling device. In the event of a failed piston, the radially inwardly directed stroke movement of the intact working piston is no longer introduced through the oppositely disposed working piston; rather, it is introduced either through the eccentric portion of the drive shaft or through the radial bearing. Thus, a loss in stroke between the outer ring of the radial bearing and the coupling device is permitted, depending on the magnitude of the clearance, which is predetermined by tolerance compensation.

More particularly, in the preferred embodiment of the present invention, the internal diameter of the annular portion of the coupling device is larger than the external diameter of the outer ring of the radial bearing and the internal diameter is flattened in the area of the axial extensions so that the clearance between the outer ring and the coupling device is distinctly smaller in that area than on the remaining periphery. On one hand, this arrangement keeps small the loss in stroke of the intact working piston upon failure of the opposed working piston, while, on the other hand, the annular portion remains sufficiently elastic to absorb minor load peaks which may occur.

Further details and advantages of a radial piston pump constructed in accordance with the present invention will become evident from the following description, with reference to the accompanying drawings.

BRIEF DESCRIPTION OF THE DRAWINGS

FIG. 2 is a top view of the coupling device;
and
FIG. 3 is a front view of the coupling device.

DETAILED DESCRIPTION OF THE INVENTION

Figure 1:
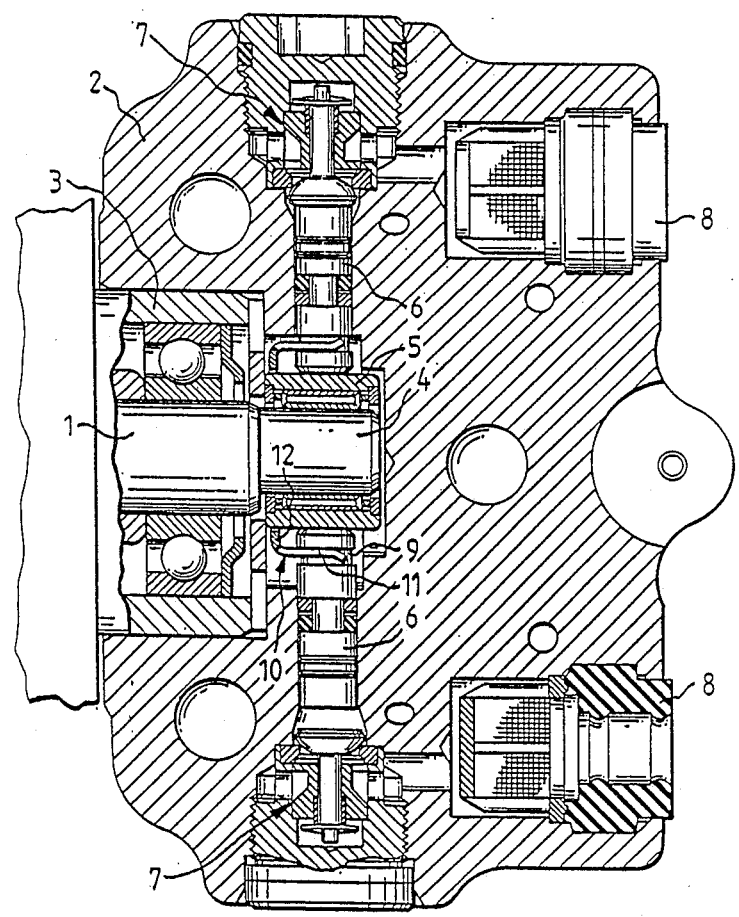
FIG. 1 is a longitudinal cross-section taken through a hydraulic pump.

The hydraulic pump illustrated in FIG. 1 is driven by an electric motor whose housing portion 3 projects into cylinder block 2. Drive shaft 1 is supported in housing portion 3 and comprises an eccentric portion 4, on which needle bearing 5 is mounted. The outer ring of needle bearing 5 supports the radially inwardly directed ends of working pistons 6. The working chambers of the hydraulic pump are each defined by a suction valve 7 and a pressure valve (not shown). The pump delivers fluid into pressure ports (not shown) through suction ports 8, which are furnished with filters.

On the end portions which project radially inwardly from cylinder block 2, working pistons 6 have a radially circumferential groove 9 into which axial extensions 11 of coupling device 10 engage in a form-locking manner. When one of working pistons 6 is displaced radially outwardly, with drive shaft 1 rotating, drive shaft 1 will entrain the opposite working piston 6 through coupling device 10, thus drawing the opposed working piston 6 inwardly to suck in pressure fluid. Coupling device 10 is annular, and annular portion 12 encompasses the outer ring of needle bearing 5 with radial clearance in order to compensate for manufacturing tolerances. The end portions of axial extensions 11 are slightly bent radially outwardly, creating a slight preload between coupling device 10 and groove 9.

FIG. 2 shows a top view of coupling device 10, which illustrates the design of axial extensions 11. Axial extensions 11, in combination, form a substantially U-shaped part. Arcuate recesses 13 inside extensions 11 accommodate working pistons 6 with little radial clearance. Transition area 14 from annular portion 12 to axial extensions 11 is concave. That configuration weakens the material and, in conjunction with the U-shaped design of axial extensions 11, creates a preset break point 15.

FIG. 3 shows the geometry of annular portion 12 of coupling device 10. The radially inner contour of annular portion 12 is substantially circular and has an internal diameter 16. In the area of axial extension 11, however, flattened zones 17 are provided on annular portion 12. The distance 18 between zones 17 is somewhat larger than the external diameter of the outer ring of needle bearing 5. Thus, the radial clearance between the outer ring of needle bearing 5 and coupling device 10 is least in the area of axial extensions 11. As a result, the loss in stroke upon failure of one working piston 6 is limited to a tolerable degree, while, on the other hand, annular portion 12 is elastically deformable by the somewhat larger internal diameter 16 so that possibly occurring load peaks can be reduced.

More particularly, should one of working pistons 6 of the radial piston pump become jammed in cylinder block 2, caused, for instance, by contamination, then coupling device 10 will break in the area of preset break point 15 of axial extension 11 which is associated with the jammed working piston 6. The return stroke movement of the oppositely disposed, intact working piston 6 causes the outer ring of needle bearing 5 to act on coupling device 10 in the area of flattened zone 17 which is opposite to the intact working piston 6.

What is claimed is:

1. A radial piston pump comprising:
    a cylinder block adapted to be mounted on the housing of an electric motor and having an axial bore;
    at least one pair of pistons extending radially of said cylinder block into said axial bore and positioned diametrically opposite to each other;
    a drive shaft extending axially of said axial bore in said cylinder block adapted to be connected to said electric motor and having a length which is eccentric relative to said axial bore;

a radial bearing mounted on said length of said drive shaft which is eccentric relative to said axial bore in said cylinder block and contacting said pistons to drive said pistons as said shaft rotates; and a coupling device having:
(a) a mounting portion for mounting said coupling device on said radial bearing, and
(b) a pair of axial extensions, each of which engage one of said pistons to couple said pistons together and is shaped and dimensioned to break at a selected fracture point upon sensing of a predetermined resistance against radially outward movement of said pistons.

2. A radial piston pump as claimed in claim 1 wherein said extensions, in combination, form a substantially U-shaped part, having legs slightly bent radially outwardly for creating a preload between said coupling device and said pistons.

3. A radial piston pump as claimed in claim 1 wherein said coupling device further comprises:
a substantially annular portion;
arcuate recesses located on the inside edges of said extensions for accommodating said pistons with little radial clearance; and
concave transition areas from said annular portion to said extensions.

4. A radial piston pump as claimed in claim 1 wherein said coupling device further comprises:
an annular portion having a substantially circular inner contour forming an internal diameter somewhat larger than the external diameter of said radial bearing; and
at least one pair of flattened zones on said inner contour of said annular portion located adjacent said extensions forming a distance between said flattened zones which is somewhat larger than said external diameter of said radial bearing but somewhat smaller than the distance between any other points on said internal diameter of said annular portion;
whereby the radial clearance between said radial bearing and said coupling device is least in the area of said extensions.

5. A radial piston pump as claimed in claim 1 wherein each of said pistons has a circumferential groove and each of said axial extensions extend into one of said circumferential grooves.

6. A radial piston pump comprising:
a cylinder block adapted to be mounted on the housing of an electric motor and having an axial bore;
at least one pair of pistons extending radially of said cylinder block into said axial bore and positioned diametrically opposite to each other;
a drive shaft extending axially of said axial bore in said cylinder block adapted to be connected to said electric motor and having a length which is eccentric relative to said axial bore;
a radial bearing mounted on said length of said drive shaft which is eccentric relative to said axial bore in said cylinder block and contacting said pistons to drive said pistons as said shaft rotates; and
a coupling device mounted on said radial bearing and having a pair of axial extensions each of which engage one of said pistons and is shaped and dimensioned to break upon sensing of a predetermined resistance against radially outward movement of said pistons, said extensions, in combination, forming a substantially U-shaped part, having legs slightly bent radially outwardly for creating a preload between said coupling device and said pistons.

7. A radial piston pump comprising:
a cylinder block adapted to be mounted on the housing of an electric motor and having an axial bore;
at least one pair of pistons extending radially of said cylinder block into said axial bore and positioned diametrically opposite to each other;
a drive shaft extending axially of said axial bore in said cylinder block adapted to be connected to said electric motor and having a length which is eccentric relative to said axial bore;
a radial bearing mounted on said length of said drive shaft which is eccentric relative to said axial bore in said cylinder block and contacting said pistons to drive said pistons as said shaft rotates; and
a coupling device having:
(a) a substantially annular portion for mounting said coupling device on said radial bearing,
(b) a pair of axial extensions each of which engage one of said pistons and is shaped and dimensioned to break upon sensing of a predetermined resistance against radially outward movement of said pistons,
(c) arcuate recesses located on the inside edges of said extensions for accommodating said pistons with little radial clearance, and
(d) concave transition areas from said annular portion to said extensions.

8. A radial piston pump comprising:
a cylinder block adapted to be mounted on the housing of an electric motor and having an axial bore;
at least one pair of pistons extending radially of said cylinder block into said axial bore and positioned diametrically opposite to each other;
a drive shaft extending axially of said axial bore in said cylinder block adapted to be connected to said electric motor and having a length which is eccentric relative to said axial bore;
a radial bearing mounted on said length of said drive shaft which is eccentric relative to said axial bore in said cylinder block and contacting said pistons to drive said pistons as said shaft rotates; and
a coupling device having:
(a) a pair of axial extensions each of which engage one of said pistons and is shaped and dimensioned to break upon sensing of a predetermined resistance against radially outward movement of said pistons, and
(b) a annular portion for mounting said coupling device on said radial bearing and having a substantially circular inner contour forming an internal diameter somewhat larger than the external diameter of said radial bearing with at least one pair of flattened zones on said inner contour of said annular portion located adjacent said extensions forming a distance between said flattened zones which is somewhat larger than said external diameter of said radial bearing but somewhat smaller than the distance between any other points on said internal diameter of said annular portion,
whereby the radial clearance between the external diameter of said radial bearing and said coupling device is least in the area of said extensions.

9. A radial piston pump comprising:

a cylinder block adapted to be mounted on the housing of an electric motor and having an axial bore;

at least one pair of pistons extending radially of said cylinder block into said axial bore and positioned diametrically opposite to each other, each of said pistons having a circumferential groove;

a drive shaft extending axially of said axial bore in said cylinder block adapted to be connected to said electric motor and having a length which is eccentric relative to said axial bore;

a radial bearing mounted on said length of said drive shaft which is eccentric relative to said axial bore in said cylinder block and contacting said pistons to drive said pistons as said shaft rotates; and a coupling device mounted on said radial bearing and having a pair of axial extensions each of which engages one of said pistons in one of said circumferential grooves and is shaped and dimensioned to break upon sensing of a predetermined resistance against radially outward movement of said pistons.

* * * * *